Nov. 8, 1927.

W. BURKE 1,648,719

INTERNAL COMBUSTION ENGINE

Filed Nov. 6, 1925   2 Sheets-Sheet 1

INVENTOR
Wm Burke
BY Victor J. Evans
ATTYS.

Patented Nov. 8, 1927.

1,648,719

UNITED STATES PATENT OFFICE.

WILLIAM BURKE, OF OAKLAND, CALIFORNIA.

INTERNAL-COMBUSTION ENGINE.

Application filed November 6, 1925. Serial No. 67,375.

This invention relates to improvements in internal combustion engines, and has particular reference to an engine wherein the cylinder and piston travel through a circle equal to that circle described by the crank shafts.

The principal object of this invention is to produce a simple engine wherein the full explosive force developed therein may be effeciently utilized.

Another object is to produce an engine which is simple to manufacture and therefore cheap in comparison with the ordinary internal combustion engine.

Other objects and advantages will be apparent during the course of the following description.

Figure 1:
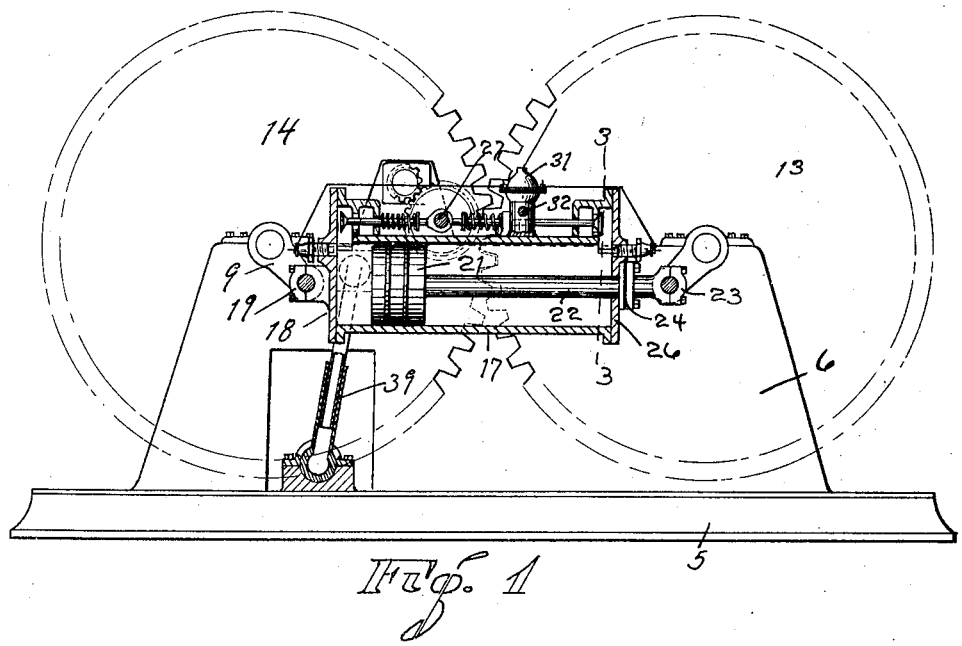
Figure 2:
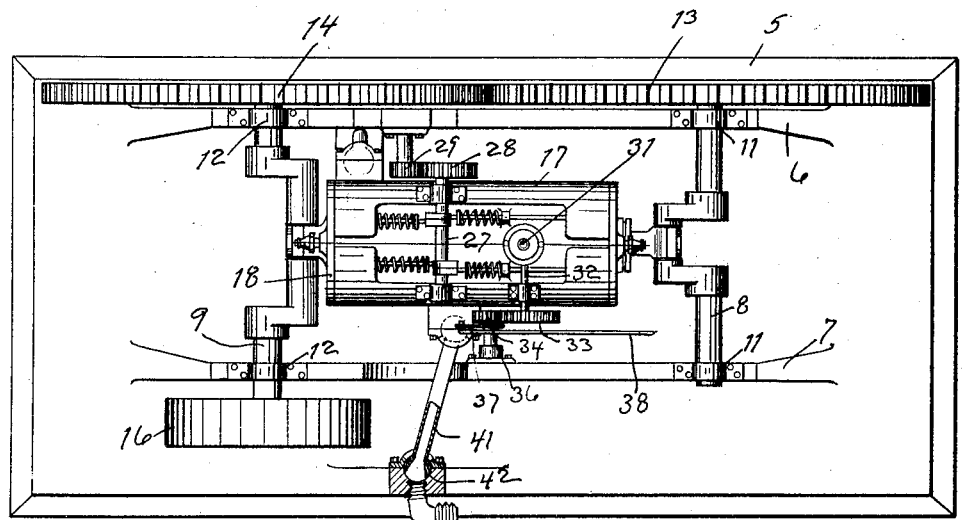
Figure 3:
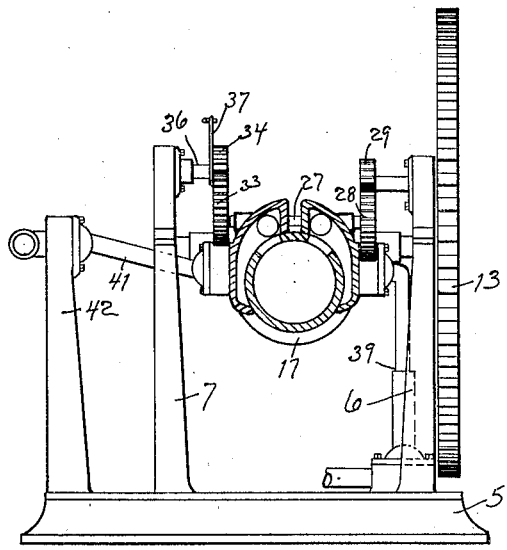
Figure 4:
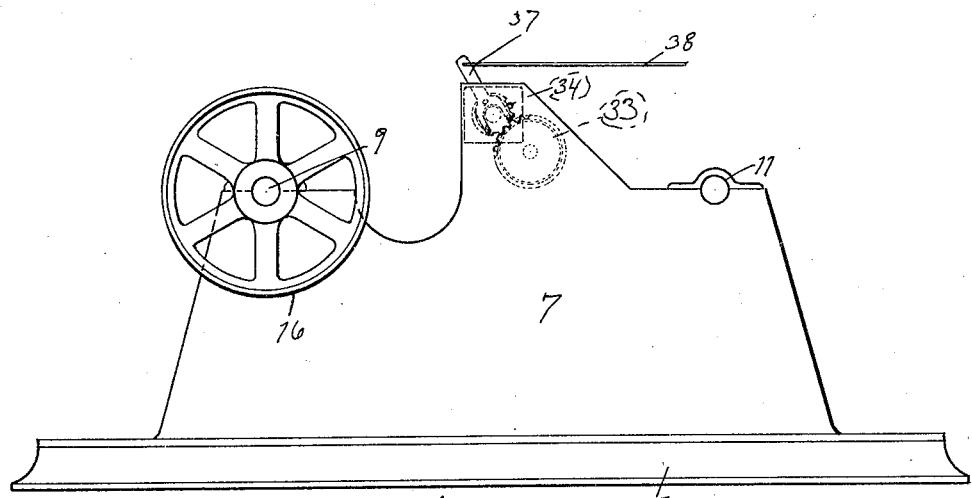

In the accompanying drawings forming a part of this specification and in which like numerals are employed to designate like parts throughout the same, Figure 1 is a vertical cross-section of my engine, Figure 2 is a top plan view of my engine, Figure 3 is a vertical cross-section taken on the line 3—3 of Figure 1, and Figure 4 is a side elevation of one of the supports upon which the spark control gear is positioned.

In the accompanying drawings wherein for the purpose of illustration is shown a preferred embodiment of my invention, the numeral 5 designates the base upon which are formed parallel supports 6 and 7. Extending between these supports are crank shafts 8 and 9 which are mounted in bearings 11 and 12, respectively.

Secured to these crank shafts 8 and 9 are gears 13 and 14 which mesh one with the other thereby causing the crank shafts to travel in unison.

A fly wheel 16 is attached to the crank shaft 9 and a similar fly wheel may be attached to the crank shaft 8, if desired.

The numeral 17 refers to the cylinder of my engine which has a head 18 provided with a bearing 19 which bearing surrounds the crank of the crank shaft 9. At 21, I have shown a piston slidably positioned within the cylinder 17 and secured to a connecting rod 22, which connecting rod is provided with a bearing 23 surrounding the crank of the crank shaft 8. This connecting rod passes through a stuffing box 24 formed in a head 26 secured to the opposite end of the cylinder 17 from the head 18.

The customary intake and exhaust valves are provided which are operated through the medium of a cam shaft 27 secured on the top of the cylinder 17, which cam shaft is provided with a gear 28 meshing with a gear 29 rigidly secured to the support 6, (see Figures 2 and 3). These gears are so proportioned that the distance between their centers is equal to the throw of the crank shafts, the purpose of which will be later seen.

At 31 I have shown a timing device for my engine of ordinary construction, which timing device is rotated by a shaft 32 having a gear 33 mounted thereon and meshing with a gear 34 carried upon a shaft 36 and rotated through the medium of a lever 37 to which is attached a control rod 38. The distance between the centers of the gears 33 and 34 is also equal to the throw of the crank shafts.

In order to conduct an explosive charge to the cylinder I provide a conduit having ball and socket connections to the base and to the cylinder. This conduit is constructed on the telescoping principal as shown at 39 (see Figures 1 and 3).

The exhaust is conducted away from the cylinder by a conduit 41 having ball and socket connections between the cylinder and a support 42. The ball and socket connection upon the support 42 is located upon the center of the axis of the movement of the cylinder.

The operation of my engine is as follows:—

Assuming that the same is running a charge will be sucked through the conduit 39 and distributed to the interior of the cylinder. After being compressed this charge will be exploded with the result that the piston will be driven toward one end of the cylinder and assuming that the parts are in the position shown in Figure 1, the piston 21 will be moved away from the cylinder head 18 or toward the right of the drawing while the cylinder will be moved toward the left of the drawing. The result will be that motion will be imparted to the crank shafts and the gears 13 and 14. The cylinder and piston will therefore travel in a circular path with the result that the gear 28 will have a planetary motion to the gear 29, while the gear 33 will have a planetary motion to the gear 34.

The result will be that the valves will be operated in the customary manner as will also the timer. When it is desired to advance or retard the timer, the control rod 38 will be moved to the right or the left as the case may be thereby moving the gear 34 a varying distance from the gear 33 with the result that the timing of the engine may be varied at will.

It will thus be seen that I have produced an engine which will operate in the manner above described and which will have all the advantages set forth.

It is to be understood that the form of my invention herewith shown and described is to be taken as a preferred example of the same and that various changes relative to the size, shape and arrangement of parts may be resorted to without departing from the spirit of the invention or the scope of the subjoined claim.

Having thus described my invention, I claim:—

In an internal combustion engine, a base, a pair of parallel spaced supports, a pair of parallel spaced crank shafts mounted on said supports, a gear secured to each of said crank shafts, said gears meshing one with the other, a cylinder positioned between said crank shafts, a head secured to one end of said cylinder and pivotally connected to one of said crank shafts, a second head secured to the opposite end of said cylinder, a piston positioned within said cylinder, a connecting rod secured to said piston, said connecting rod passing through said second mentioned head and being pivotally connected to the other of said crank shafts, a cam shaft positioned on said cylinder for the purpose of operating the intake and exhaust valves thereof, a gear mounted on said cam shafts, a stationary gear mounted on one of said supports and meshing with said last mentioned gear, said gear on said cam shaft being capable of a planetary movement about said stationary gear, said planetary movement serving to operate said intake and exhaust valves, a timer positioned on said cylinder, said timer including a gear secured thereto, a second gear positioned on one of said supports and meshing with said timer gear, said gear on said timer being capable of planetary movement about said stationary gear, said planetary movement serving to rotate said timer and means for delivering an explosive charge to said cylinder, for the purpose specified.

In testimony whereof I affix my signature.

WILLIAM BURKE.